(12) United States Patent
Hoover et al.

(10) Patent No.: US 9,007,427 B2
(45) Date of Patent: Apr. 14, 2015

(54) METHOD AND SYSTEM FOR PROVIDING VIRTUAL CONFERENCING

(75) Inventors: Scott J. Hoover, Allen, TX (US);
Joseph A. Hilburn, Frisco, TX (US);
Paul V. Hubner, McKinney, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 527 days.

(21) Appl. No.: 13/325,887

(22) Filed: Dec. 14, 2011

(65) Prior Publication Data

US 2013/0155169 A1 Jun. 20, 2013

(51) Int. Cl.
*H04N 7/14* (2006.01)
*H04N 7/15* (2006.01)

(52) U.S. Cl.
CPC ..................... *H04N 7/157* (2013.01)

(58) Field of Classification Search
CPC ............ H04N 7/14–7/148; H04N 7/15–7/157; H04N 7/18–7/188; H04N 21/40
USPC ............... 348/14.01–14.16; 370/259–271, 370/351–357; 709/201–207, 217–248
See application file for complete search history.

(56) References Cited

U.S. PATENT DOCUMENTS

| | | | |
|---|---|---|---|
| 6,195,116 B1 * | 2/2001 | Lee | 348/14.09 |
| 8,072,479 B2 * | 12/2011 | Valliath et al. | 348/14.01 |
| 8,294,823 B2 * | 10/2012 | Ciudad et al. | 348/586 |
| 2008/0077953 A1 * | 3/2008 | Fernandez et al. | 725/32 |
| 2008/0136898 A1 * | 6/2008 | Eisenberg et al. | 348/14.09 |
| 2008/0254829 A1 * | 10/2008 | Kano et al. | 455/556.1 |
| 2009/0033737 A1 * | 2/2009 | Goose et al. | 348/14.07 |
| 2009/0300525 A1 * | 12/2009 | Jolliff et al. | 715/764 |
| 2009/0315915 A1 * | 12/2009 | Dunn et al. | 345/632 |
| 2010/0037151 A1 * | 2/2010 | Ackerman et al. | 715/753 |
| 2010/0153858 A1 * | 6/2010 | Gausman et al. | 715/757 |
| 2011/0102539 A1 * | 5/2011 | Ferren | 348/14.08 |
| 2011/0276902 A1 * | 11/2011 | Li | 715/757 |
| 2012/0050323 A1 * | 3/2012 | Baron et al. | 345/632 |
| 2012/0056971 A1 * | 3/2012 | Kumar et al. | 348/14.02 |
| 2012/0062689 A1 * | 3/2012 | Sai et al. | 348/14.09 |
| 2012/0140020 A1 * | 6/2012 | Rosenberg et al. | 348/14.07 |
| 2012/0327172 A1 * | 12/2012 | El-Saban et al. | 348/14.02 |

* cited by examiner

*Primary Examiner* — Hemant Patel

(57) ABSTRACT

An approach for providing virtual conferencing is described. A virtual conference platform receives, in real-time, images representing users of the respective mobile devices, selects a virtual environment among a plurality of virtual environments, and integrates the images into the selected virtual environment.

21 Claims, 12 Drawing Sheets

METHOD AND SYSTEM FOR PROVIDING VIRTUAL CONFERENCING

BACKGROUND INFORMATION

Wireless networking technologies offer users the convenience of mobility and ease of connection to a network. Users not only employ mobile devices to connect people in real-time for personal use, e.g., family, friends, but also for business applications as well. Thus, mobile devices are routinely utilized to enable communications among employees who may be scattered across the globe; e.g., doctors to their patients, students to their teachers, etc. With the advances in broadband technologies, service providers have offered a number of sophisticated services, including video conferencing. Unfortunately, traditional video communication schemes communicate in real-time from single user perspective, e.g., a perspective captured by a camera. That is, users may need to be mindful to record images that provide an effective view of the user, e.g., configure camera zoom to show facial features. Further, users are unable to interact with virtual collaboration information, e.g., slide show, virtual whiteboard, and the like using customary body gestures, e.g., pointing at features, covering features. Consequently, inefficiencies in conducting video communications result, along with an increasingly burdensome user experience.

Therefore, there is a need for an approach that conveniently and efficiently connects people in real-time.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

An apparatus, method and software for providing virtual conferencing are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Although the various exemplary embodiments are described with respect to mobile devices including cellular phones, it is contemplated that these embodiments have applicability to other types of computing devices (e.g., desktop computers, laptops, netbooks, web appliances, etc.).

Figure 1:
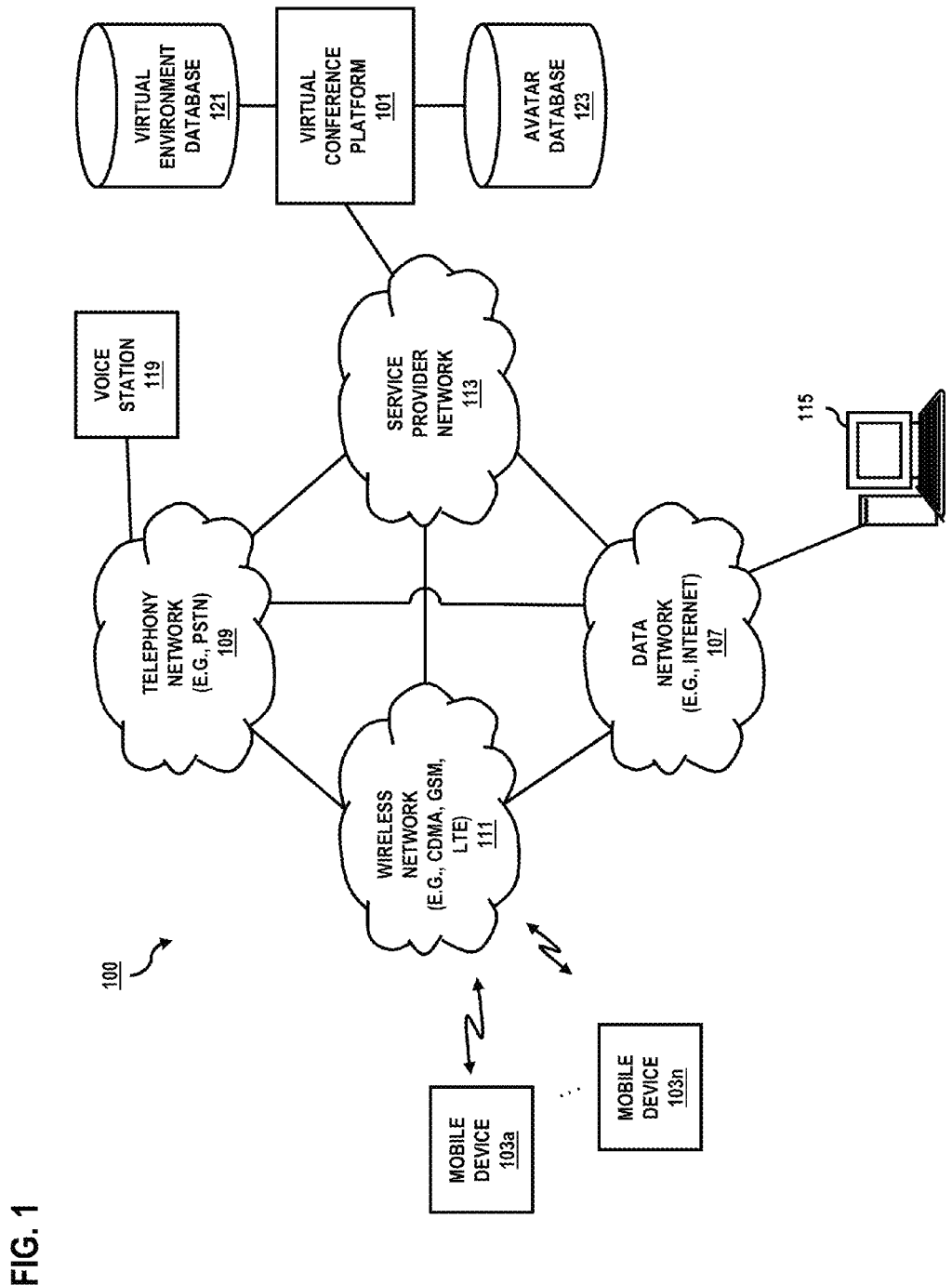
FIG. 1 is a diagram of a system capable of providing virtual conferencing, according to an exemplary embodiment.

FIG. 1 is a diagram of a system capable of providing virtual conferencing, according to an exemplary embodiment. For the purpose of illustration, the system 100 employs a virtual conference platform 101 that is configured to provide virtual conferencing in which the participants can control their environments. As used herein, virtual conferencing services of virtual conference platform 101 include services that involve recording images from multiple devices, integrating (or rendering) the images into a virtual environment, and generating user perspectives of the integrated images and virtual environment. In this manner, images representing users of the virtual conferencing services are processed to support multiple user perspectives, virtual environments, and avatars to enable effective communication.

The virtual conferencing services may, for instance, be initiated using one or more user devices (e.g., mobile devices 103 (or mobile devices 103a-103n)) over one or more networks (e.g., data network 107, telephony network 109, wireless network 111, service provider network 113, etc.). According to one embodiment, services including virtual conferencing may be part of managed services supplied by a service provider (e.g., a wireless communication company) as a hosted or subscription-based service made available to users of the mobile devices 103 through a service provider network 113. For instance, conference platform 101 can process a request from mobile device 103a to initiate virtual conferencing. The request for virtual conference may include the use of a graphical user interface (GUI) configured to create a virtual conference, invite other users (or subscribers) to join, and collect preference information such as a desired virtual environment and avatar. Alternatively, the request for a virtual conference may cause the virtual conference platform 101 to initiate a request to join a virtual conference along with a request for preference information. It is contemplated that preference information may also be stored on the virtual conference platform 101.

As shown, the virtual conference platform 101 may be a part of or connected to the service provider network 113. According to another embodiment, the virtual conference platform 101 may be included within or connected to the mobile devices 103, a computing device 115, etc. While specific reference will be made thereto, it is contemplated that the system 100 may embody many forms and include multiple and/or alternative components and facilities. Conference platform 101 can provide virtual conferencing to facilitate, for example, a business meeting, an anniversary dinner, a virtual classroom, a virtual hospital, and the like.

In certain embodiments, the virtual conference platform 101 may include or have access to virtual environments, whereby the data and parameters for creating such environment is stored in a virtual environment database 121. Each virtual environment integrates images of users for particular uses (e.g., round table discussion, slide show presentation, etc.) Additionally, groups (e.g., corporations, schools, family) may customize virtual environments to include names, slogans, familiar items and the like. For example, the virtual conference platform 101 may access the virtual environment database 121 to acquire data specifying, e.g., a company logo to be utilized in virtual conferences for company employees.

In certain embodiments, the virtual conference platform 101 accesses an avatar database 123 to populate users in a virtual environment. An avatar is used in creating a graphical representation of a human user to enable users to communicate using body language, and to interact with collaboration information. An avatar may correspond to movements of part of the user (e.g., face, head, etc.) or the entire user. For example, the virtual conference platform 101 may generate a skeletal map of each user to map movements onto the avatar. Additionally, the avatar may display images of the user (e.g., mapping user's face onto avatar) or use images associated with the avatar (e.g., profile picture, name, symbol, etc.). Further, the avatar may display information unique to the user, for example, personal slogans, titles, awards, geolocation, status and the like.

As mentioned, typical video conferencing systems rely on a single user perspective. That is, users are viewable only from a perspective captured by the camera. Additionally, such systems do not easily facilitate a group meeting, and result in inefficiencies as well as a burdensome experience. For example, images of multiple users in a group meeting are frequency tiled together making it difficult to show collaboration information (e.g., slide, whiteboard), particularly on smaller screens (which is typical of mobile devices—e.g., smart phones). Additionally, this tiling of images is particularly inefficient and burdensome when the group discussion is focused on a single speaker because much of the display can be focused away from the single speaker. Also, the tiling of user images limits the ability for users to communicate using body language to interact (e.g., point at other users, collaboration images, etc.).

To address this issue, the system 100 of FIG. 1 introduces the capability to integrate a representation of a user onto an avatar located within a virtual environment using a virtual conference platform. The avatar can be configured to normalize the representation of users by managing scale, contrast, lighting, topographic relief and the like to enable multiple user perspectives. The virtual environment can be configured to support multiple uses (e.g., round table discussion, slide show presentation) and customizable by users (e.g., names, slogans, familiar items). Additionally, the virtual environment can include collaboration information that is accessible to users (and avatars) to enable such users to interface (e.g., view, modify, remove, etc.) the collaboration information.

By way of example, mobile device 103 users can benefit from the services of virtual conference platform 101, whereby images representing a user (e.g., video recording of facial features) can be placed on an avatar located in a virtual environment viewable by other users of a group. For instance, user of mobile device 103 can be provided with an avatar and virtual environment stored in a virtual conference platform 101; in addition, multiple avatars representing multiple users can be used in this virtual environment. In certain embodiments, the virtual conference platform 101 includes a variety of virtual environments to support various types of meetings, such as single speaker, round-table discussions, presentation of slides, panel discussions and the like to efficiently combine multiple users in different contexts. Further, the virtual conference platform 101 can be configured to integrate body language of users onto the avatars to enable interaction between users and to support the use of collaboration information by incorporating the collaboration information in the virtual environment. The users may then cause avatars to point at or conceal portions of the collaboration information.

By way of example, mobile devices 103 may be any type of mobile terminal including a mobile handset, mobile station, mobile unit, multimedia computer, multimedia tablet, communicator, netbook, Personal Digital Assistants (PDAs), smartphone, media receiver, etc. It is also contemplated that the mobile devices 103 may support any type of interface for supporting the presentment or exchange of data. For example, the mobile device 103 may facilitate various output means, including image/pico projectors (e.g., projecting images on a desk or screen), liquid crystal display, active matrix display, plasma display and the like. In addition, mobile devices 103 may facilitate various input means for receiving and generating information, including a camera, touch screen capability, keyboard and keypad data entry, voice-based input mechanisms, accelerometer (e.g., shaking the mobile device 103), and the like. Any known and future implementations of mobile devices 103 are applicable. Also, connectivity may be provided via a wireless local area network (LAN). By way of example, a group of mobile devices 103 may be configured to a common LAN so that each device can be uniquely identified via any suitable network addressing scheme. For example, the LAN may utilize the dynamic host configuration protocol (DHCP) to dynamically assign "private" DHCP internet protocol (IP) addresses to each mobile device 103, i.e., IP addresses that are accessible to devices connected to the service provider network 113 as facilitated via a router.

In some embodiments, the virtual conference platform 101, the mobile devices 103, and other elements of the system 100 may be configured to communicate via the service provider network 113. According to certain embodiments, one or more networks, such as the data network 107, the telephony network 109, and/or the wireless network 111, may interact with the service provider network 113. The networks 107-113 may be any suitable wireline and/or wireless network, and be managed by one or more service providers. For example, the data network 107 may be any local area network (LAN), metropolitan area network (MAN), wide area network (WAN), the Internet, or any other suitable packet-switched network, such as a commercially owned, proprietary packet-switched network, such as a proprietary cable or fiber-optic network. For example, computing device 115 may be any suitable computing device, such as a VoIP phone, skinny client control protocol (SCCP) phone, session initiation protocol (SIP) phone, IP phone, personal computer, softphone, workstation, terminal, server, etc. The telephony network 109 may include a circuit-switched network, such as the public switched telephone network (PSTN), an integrated services digital network (ISDN), a private branch exchange (PBX), or other like network. For instance, voice station 119 may be any suitable plain old telephone service (POTS) device, facsimile machine, etc. Meanwhile, the wireless network 111 may employ various technologies including, for example, code division multiple access (CDMA), long term evolution (LTE), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), satellite, and the like.

Although depicted as separate entities, the networks 107-113 may be completely or partially contained within one another, or may embody one or more of the aforementioned infrastructures. For instance, the service provider network 113 may embody circuit-switched and/or packet-switched networks that include facilities to provide for transport of circuit-switched and/or packet-based communications. It is further contemplated that the networks 107-113 may include components and facilities to provide for signaling and/or bearer communications between the various components or facilities of the system 100. In this manner, the networks 107-113 may embody or include portions of a signaling system 7 (SS7) network, Internet protocol multimedia subsystem (IMS), or other suitable infrastructure to support control and signaling functions.

Figure 2:
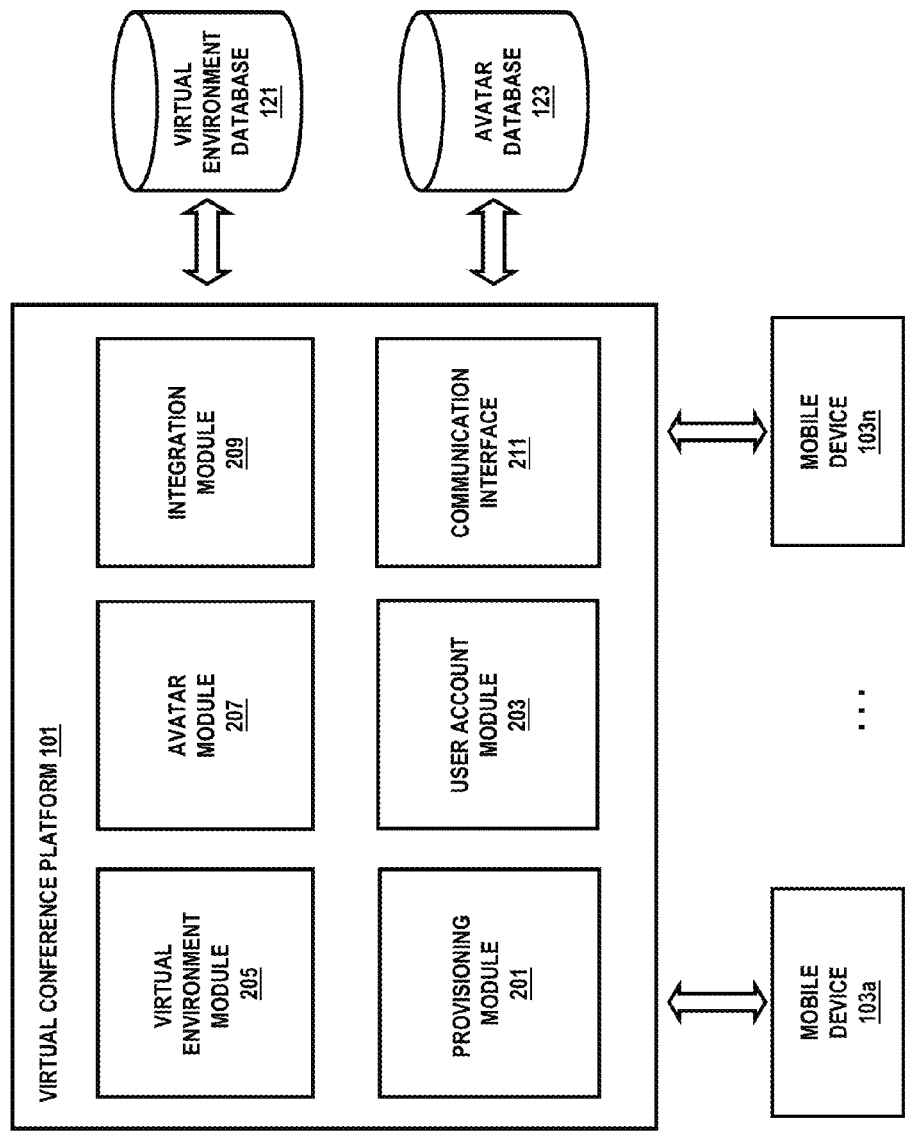
FIG. 2 is a diagram of the components of a virtual conference platform, according to an exemplary embodiment.

FIG. 2 is a diagram of the components of a virtual conference platform 101 (e.g., network processing server), according to an exemplary embodiment. The virtual conference platform 101 may comprise computing hardware (such as described with respect to FIGS. 7 and 8), as well as include one or more components configured to execute the processes described herein for providing virtual conferencing of the system 100. It is contemplated that the functions of these components may be combined in one or more components or performed by other components of equivalent functionality. In one implementation, the virtual conference platform 101 includes a provisioning module 201, user account module 203, virtual environment module 205, avatar module 207, integration module 209, and communication interface 211.

The provisioning module 201 may deliver mobile content to the mobile device 103 to enable virtual conferencing. The provisioning module 201 may also update, for example, the version, language settings, or type of installation for the virtual conference platform 101.

The user account module 203 may work with the mobile device 103 to provide secure access to a user's data. Secure access may be provided by the use of an authentication procedure such as an inputting of credentials, biometric authentication, and the like. User data can include preference information, contact information (e.g., group associations, friends, family and the like), and conferencing information (e.g., collaboration information, playback, etc.) and the like. It is contemplated that a user account module 203 may be configured to accept user availability information, schedule virtual conferences, send reminders/updates, and the like in order to facilitate the scheduling of a virtual conference.

Preference information may include information regarding default parameters (e.g., preferred avatar, preferred virtual environment, preferred perspective etc.), a default representation of a user (e.g., profile picture), and whether to include or exclude the representation of the user in the user's own perspective. The default representation of a user may be displayed in the contact information associated with the user, and also displayed on an avatar. As noted, the virtual conference platform 101 may allow a user to select whether to include or exclude the representation of the user in the user's own perspective. For example, an active participant (e.g., user presenting slides, leading a discussion, etc.) may select to include the representation of the user in order to interact with the virtual environment. On the other hand, inactive participants (e.g., viewer, audience, etc.) may select to exclude the representation of the user to reserve more room in the virtual environment to view the active participants.

Contact information may include associations with individual users, groups of users (e.g., corporations, organizations, families, friends, etc.). Such associations may provide access to avatars and/or virtual environments that are customized for a particular group (e.g., corporate logo). For example, a corporation may grant a user access to a customized virtual environment that includes a corporate logo or slogan. Additionally, a group may provide a user access to customized avatars. For example, a corporation may grant a user access to customized avatars that indicate corporate titles (e.g., associate, manager, etc.), awards (e.g., sale leader, employee of the month, etc.), and geolocation.

Conferencing information may include collaboration information, playback information, and the like. As used herein, collaboration information refers to text documents (e.g., MICROSOFT WORD, EMACS, OPEN OFFICE), presentation programs (e.g., MICROSOFT POWERPOINT, GOOGLE DOCS, OPEN OFFICE, APPLE KEYNOTE), image files (e.g., raster, vector, stereo), video files (e.g., H.263, MPEG), computer aided drafting (e.g., AUTOCAD, SOLID EDGE). It is contemplated that the collaboration information may be stored on one or more networks (e.g., data network 107, telephony network 109, wireless network 111, service provider network 113, etc.) accessible by the virtual conference platform 101. The virtual conference platform 101 may be configured to receive collaboration information (e.g., receive data, or receive information indicating a location data may be retrieved), incorporate modifications from users, and provide users access to the collaboration information. By way of example, a user inputs into a mobile device a location that a presentation file may be retrieved, the virtual conference platform 101 then retrieves and displays the presentation file into a virtual environment. The presentation file may then be modified by users, and made available after the conference session has ended. It is contemplated that the virtual conference platform may only allow collaboration information to be modified by some of the users, for example, attendees, premium subscribers, presenters, and the like. Additionally, the virtual conference platform 101 may be configured to record a virtual conference to enable playback of the virtual conference. In this manner, users (attendees or premium subscribers) may access the virtual conference platform to playback a previous virtual conference.

According to one embodiment, conference platform 101 may include a virtual environment module 205 to provide virtual environments associated with a particular use (e.g., business meeting, anniversary dinner, virtual teaching, virtual doctor, etc.) of virtual conferencing between multiple users of the mobile devices 103. In addition, virtual environments may also provide users the ability to select configurations of objects within the virtual environment to facilitate discussion. For example, the virtual environment may include a conference table and integrate images representing users around the table to facilitate a group discussion. In another embodiment, the virtual environment includes a group of designated users (e.g., panel speakers) to facilitate a panel presentation. Virtual environments may include an area associated with collaboration information (e.g., slide show, white board) to allow users to share, and modify information in real-time. It is contemplated that users may customize a virtual environment to include personal slogans, corporate logos, representations of familiar items and the like.

Virtual environments may be generated and provided as part of managed services supplied by a service provider (e.g., a wireless communication company) as a hosted or subscription-based service made available to users of the mobile devices 103 through a service provider network 113. Additionally, Virtual environments may be generated and/or modified by others, including users of the mobile devices 103, and users of the computing device 115. Likewise, virtual environments may be public and accessible to users of the virtual conference platform 101, or may be accessible to limited group of users of the virtual conference platform 101. For example, some virtual environments may be accessible to premium subscribers, or members of a group associated with the virtual environment (e.g., employees, students, family, etc.)

According to one embodiment, conference platform 101 may include an avatar module 207 configured represent users in the virtual environment. In one embodiment, the virtual conference platform 101 integrates an image representing a user's face on the head of an avatar. In another embodiment, the virtual conference platform 101 maps a user's face on the head of an avatar and updates the avatar's body to represent the user's movement. The avatars may be static (e.g., a single image), or dynamic (e.g., real-time images representing the user). Additionally, avatars may be animated. It is contemplated that a static avatar may be selected by users lacking access to a recording device (e.g., camera). Avatars may be scaled based on a selected environment, and participants. By way of example, a selected avatar may be scaled larger when fewer participants, and/or when fewer objects (e.g., collaboration information, tables, etc.) are displayed in a perspective. Similarly, images representing users that are mapped onto avatars may be normalized. By way of example, an image representing a first user may be larger than an image representing a second user due to a difference in recording resolution, zoom, distance from the recording device and the like. Avatars representing users modifying or adding collaboration information may be also emphasized (e.g., increase contrast, increase brightness, topographical relief) or may be modified to include additional objects (e.g., writing utensil).

Similar to virtual environments, avatars may be generated and provided as part of managed services supplied by a service provider (e.g., a wireless communication company) as a hosted or subscription-based service made available to users of the mobile devices 103 through a service provider network 113. Additionally, avatars may be generated and/or modified by others, including users of the mobile devices 103, and users of the computing device 115. Avatars may be made available publicly, and thus, accessible to users of the virtual conference platform 101, or may be accessible to limited group of users of the virtual conference platform 101 (e.g., premium subscribers, authorized users). Additionally, avatars may be customized to indicate corporate titles (e.g., associate, manager, etc.), awards (e.g., sale leader, employee of the month, etc.) and geolocation.

According to one embodiment, conference platform 101 may include an integration module 209 for generating output information for each user in a virtual video conference. The integration module 209 may incorporate collaboration information, images representing users, a virtual environment, avatars and the like to generate, in real-time, a point of view for each user's perspective. For example, the integration module 209 may receive images from representing a user, and map those images on an avatar included in outputs to other users. That is, each user in the virtual conference shares a virtual environment, and collaboration information, but has a unique perspective (e.g., excludes image representing self). In another embodiment, non-participating users (e.g., audience, viewers, etc.) share a single perspective, and the participating users (e.g., lecturers, panel group, etc.) share a single perspective. For example, users identified as an audience of a slide show may have a perspective that includes a speaker and the slide show, while the speaker may have a perspective that includes the audience and the slide show. In this manner, the perspective in the virtual conference may be configured to be similar to a perspective in a real conference. Additionally, integration module 209 may be configured to record one or more of the perspectives to enable playback of the virtual conference.

Integration module 209 may also allow users (or attendees) without mobile devices to participate in the virtual conference. In one embodiment, the virtual conference platform 101 is configured to allow users to join (or create) a virtual conference using a computing device 115 configured with a webcam and microphone. In another embodiment, the virtual conference platform 101 is configured to allow users to join (or create) a virtual conference using voice station 119 (e.g., suitable plain old telephone service (POTS) device, facsimile machine). As noted, it is contemplated that users lacking a video recording device may be represented in a virtual environment by an avatar containing a static image of representing the user.

Integration module 209 may also allow users to select or manage their perspective by sending a request to the virtual conference platform 101. By way of example, a user may use a graphical user interface (GUI) to input a request to remove or add avatars, collaboration material, objects, and the like from their perspective. Additionally, or alternatively, a user may use a graphical user interface to input a request to manage zoom, angle/field of view, and the like.

The virtual conference platform 101 may further include a communication interface 211 to communicate with other components of the virtual conference platform 101, the mobile devices 103, and other components of system 100. The communication interface 211 may include multiple means of communication. For example, the communication interface 211 may be able to communicate, over short message service (SMS), multimedia messaging service (MMS), internet protocol, instant messaging, voice sessions (e.g., via a phone network), email, or other types of communication. Additionally, communication interface 211 may include a web portal accessible by, for example, mobile device 103, computing device 115 and the like.

It is contemplated that to prevent the unauthorized access, conference platform 101 may include an authentication identifier when transmitting signals to mobile devices 103. For instance, control messages may be encrypted, either symmetrically or asymmetrically, such that a hash value, for instance, can be utilized to authenticate received images, as well as ensure that those signals have not been impermissibly detected in transit. As such, communications between the mobile devices 103 and conference platform 101 may include various identifiers, keys, random numbers, random handshakes, digital signatures, and the like.

Figure 3:
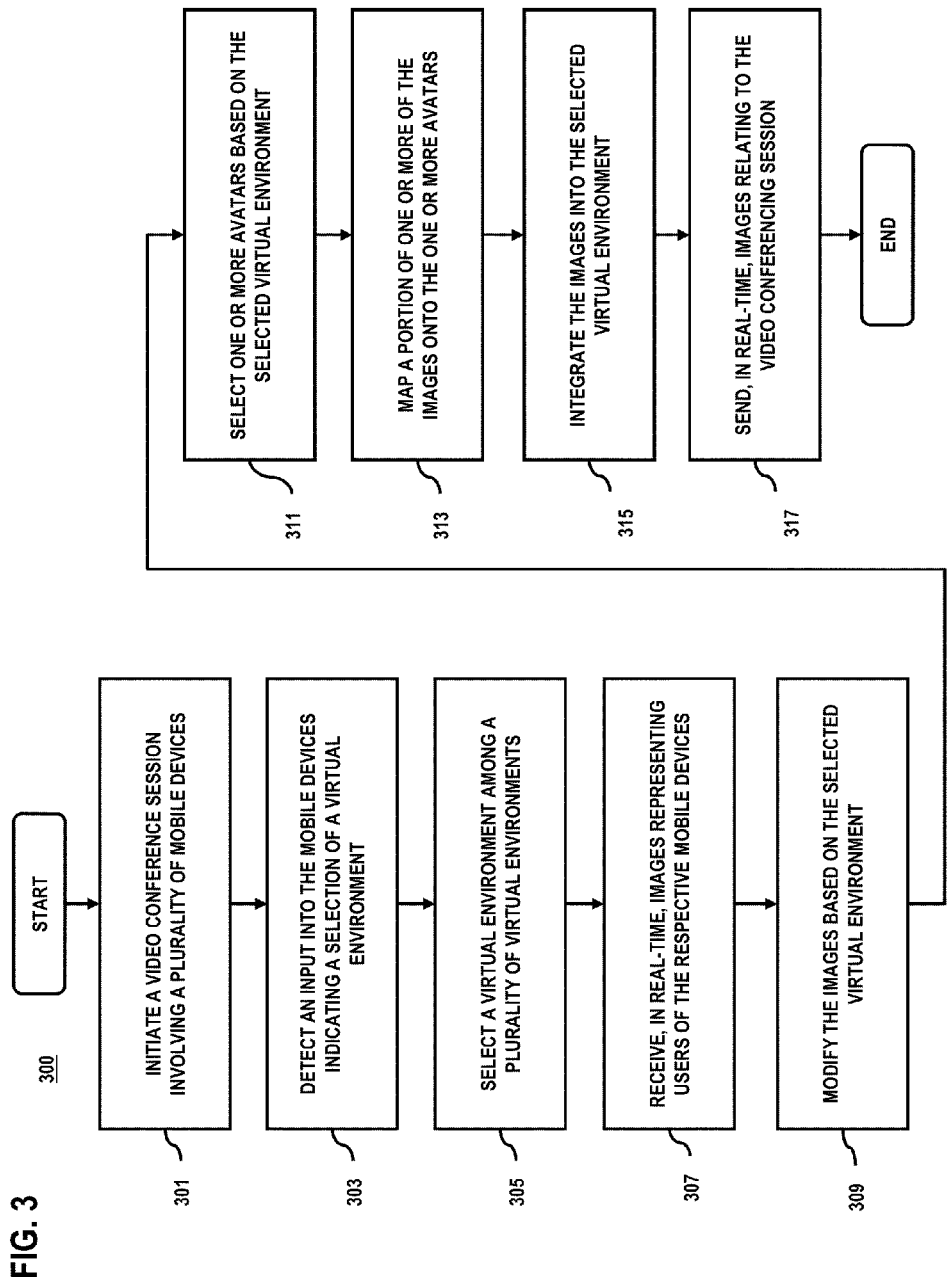
FIG. 3 is a flowchart of a process for conducting a virtual conference, according to an exemplary embodiment.

FIG. 3 is a flowchart of a process for conducting a virtual conference, according to an exemplary embodiment. For illustrative purpose, process 300 is described with respect to the system of FIG. 1. It is noted that the steps of process 300 may be performed in any suitable order, as well as combined or separated in any suitable manner. In step 301, the virtual conference platform 101 initiates a video conference session involving multiple mobile devices (e.g., devices 103a-103n). By way of example, such request can be triggered by a user creating a virtual conference (and inviting others), or it may be triggered by joining a virtual conference created by another. The virtual conference platform 101 may then, as in step 303, detect an input into the mobile device (e.g., device 103a) indicating a selection of the virtual environment. As used herein, a detected input may include use of a touch screen, keyboard, voice input, camera, accelerometer and the like. By way of example, the user creating a virtual conference may specify the virtual environment. Alternatively, the other users invited to the virtual conference input can specify the virtual environment. In step 305, the virtual conference platform 101 may select a virtual environment among multiple virtual environments. In one embodiment, the virtual conference platform 101 selects a virtual environment inputted by the user who created or initiated the virtual conference. In another embodiment, the virtual conference platform 101 selects the virtual environment inputted the most by the invited users (or a group of users). It is contemplated that various other schemes to select a virtual environment may be used, for example the user creating the virtual conference may select a group of virtual environments (e.g., environments configured for a panel discussion), and the virtual environment is determined by votes received from users invited to the virtual conference.

Once the virtual environment is selected, the virtual conference platform 101 may, as in step 307, receive, in real-time, images representing users of the respective mobile devices. For example, a camera located on a mobile device may record images of a respective user and send the images to the virtual conference platform 101. It is contemplated that a forward facing camera may be used to allow users to simultaneously record images and view information on a display located on the mobile device. Additionally, or alternatively, a forward facing camera may be used to allow users to simultaneously record images and view information projected by a pico projector located on the mobile device.

Once the images representing users are received, the virtual conference platform 101 may, as in step 309, modify the images based on the selected virtual environment. By way of example, the virtual conference platform 101 may detect a representation of a user in the received images, remove the background, and render the representation of the user on a background associated with the selected virtual environment. Additionally, the virtual conference platform 101 may also normalize the size of images representing users due to a difference in recording resolution, zoom, distance from the recording device and the like. As noted, the virtual conference platform 101 may also render a static image to represent users, for example, users using a plain old telephone service, or mobile device lacking a camera.

Next, the virtual conference platform 101 may, as in step 311, select one or more avatars based on the selected virtual environment. That is, the virtual conference platform 101 selects one or more avatars associated with a virtual environment. By way of example, the virtual conference platform 101 may select a single avatar representing a designated user (e.g., a speaker/presenter) for a virtual environment with a single presenter (other users are not represented by an avatar). In another example, the virtual conference platform 101 may select an avatar for each user for a virtual environment configured for a conference table discussion. It is contemplated that the selection of an avatar may also be based on an input detected on one or more mobile devices. In one embodiment, the virtual conference platform 101 selects a group of avatars available, and each user selects an avatar. In another embodiment, the virtual conference platform 101 selects a group of avatars available, each user selects a preferred avatar, and the virtual conference platform 101 selects the avatar with the most votes for each user. It is contemplated that each groups or type of users (e.g., non-participating, and participating) may vote for an avatar to be used for that group or type of users.

Once the avatars have been selected, the virtual conference platform 101 may, as in step 313, map a portion of one or more of the images onto the one or more avatars. That is, the images representing a user (and modified) are placed onto one or more avatars. In one embodiment, the images representing a user are mapped to a single avatar. In another embodiment, an avatar contains images representing multiple users. In yet another embodiment, the images representing a single user is mapped onto multiple avatars. After mapping a portion of one or more of the images onto one the one or more avatars, the virtual conference platform 101 may, as in step 315, integrate the images into the selected virtual environment. That is, the images mapped onto an avatar may be placed (or made viewable) into the virtual environment. By way of example, the avatars with the images are placed in a round table near collaboration information to enable the users to interact with each other and the collaboration information. Next, the virtual conference platform 101 may, as in step 317, send, in real-time, images relating to the video conferencing session. As previously noted, conference platform 101 may be configured to send each user a different perspective of the virtual conference based on an automated perspective (e.g., update the leaving or entering of other users), and/or a managed perspective (e.g., add or remove avatars or objects, change scale, angle of view, etc.) Additionally, or alternatively, users may receive a perspective based on their participation in the discussion (e.g., presenter views the audience, and the audience views the presenter).

Figure 4:
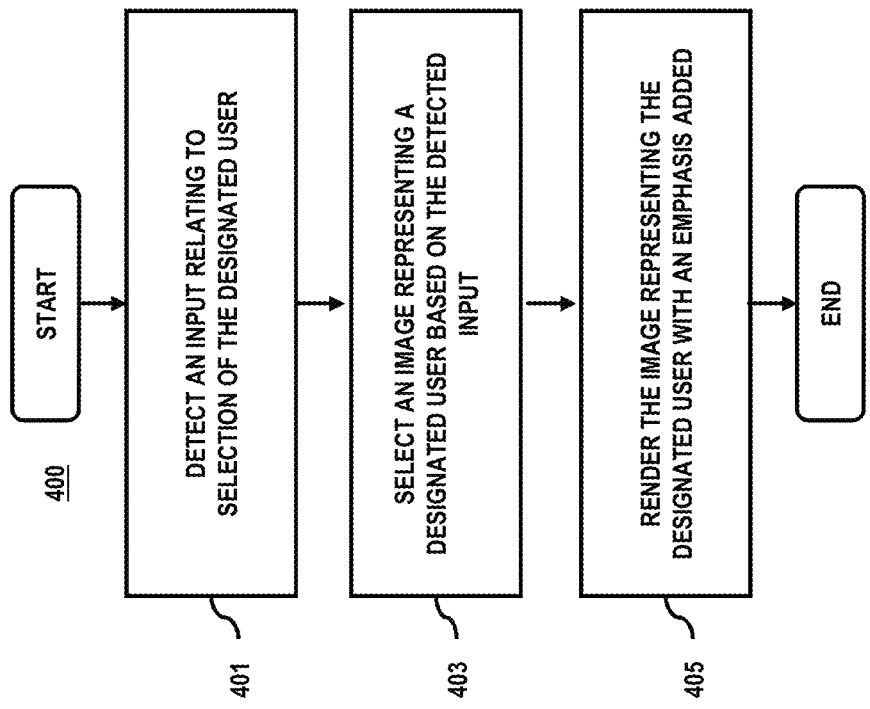
FIG. 4 is a flowchart of a process for designating a user in support of a virtual conference, according to an exemplary embodiment.

FIG. 4 is a flowchart of a process for designating a user in support of a virtual conference, according to an exemplary embodiment. For illustrative purpose, process 400 is described with respect to the system of FIG. 1. It is noted that the steps of process 400 may be performed in any suitable order, as well as combined or separated in any suitable manner. In step 401, the virtual conference platform 101 detects an input indicating a selection of the designated user. In one embodiment, the virtual conference platform 101 designates the user by polling (or requesting) users of a virtual conference to indicate a designated user (e.g., speaker, presenter, etc.) and detecting input into the users' mobile devices. It is contemplated that the polling may be performed before or during the virtual conference, and results may be displayed in the virtual environment in real-time. In another embodiment, the virtual conference platform 101 requests and detects input from a creator of the virtual conference indicating a designated user. In yet another embodiment, the virtual conference platform 101 causes mobile devices to detect audio input, and designates a user based on the detection of audio input.

The virtual conference platform 101 then selects, as in step 403, an image representing a designated user based on the detected input. For example, the virtual conference platform 101 may select the images received (and modified) from the designated user. Once the virtual conference platform 101 selects an image, it renders, as in step 405, the image representing the designated user with an emphasis added. By way of example, the emphasis may include effects using lighting, contrast, topographical relief and the like.

Figure 5:
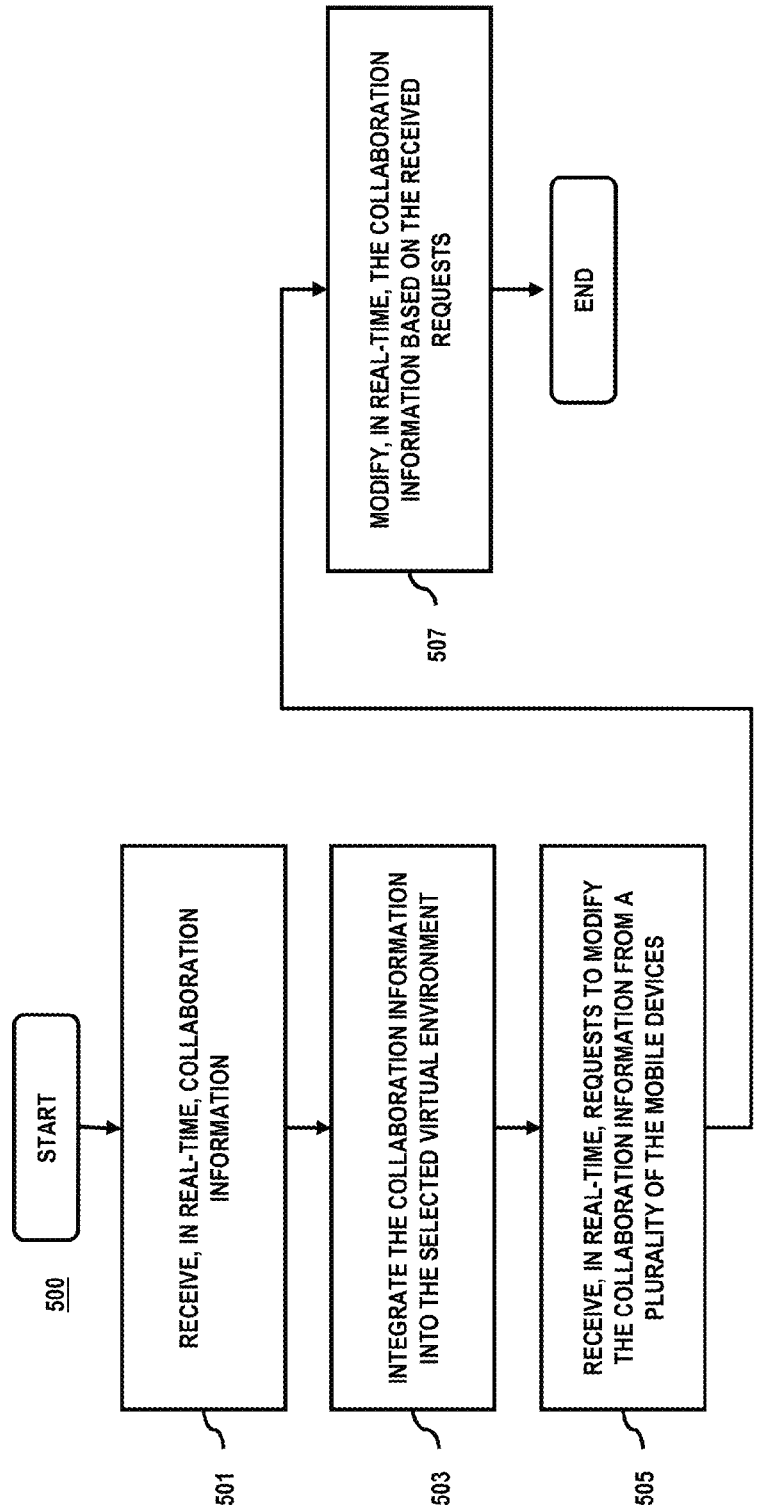
FIG. 5 is a flowchart of a process for integrating collaboration information, according to an exemplary embodiment.

FIG. 5 is a flowchart of a process for integrating collaboration information, according to an exemplary embodiment. For illustrative purpose, process 500 is described with respect to the system of FIG. 1. It is noted that the steps of process 500 may be performed in any suitable order, as well as combined or separated in any suitable manner. In step 501, the virtual conference platform 101 receives, in real-time, collaboration information. By way of example, any user invited to the virtual conference may send collaboration information to the virtual conference platform 101. It is contemplated that users not invited to the virtual conference may also send collaboration information or that some users invited to the virtual conference may not be providing such collaboration information. The virtual conference platform 101 then integrates, as in step 503, the collaboration information into the selected virtual environment. For example, the virtual conference platform 101 displays the collaboration information in a viewable area of the virtual environment (e.g., next to a presenter). It is contemplated that some perspectives of the virtual environment may not display the collaboration information, for example, a view of the audience. Once the virtual conference platform 101 integrates the collaboration information, it receives, as in step 505, in real-time, requests to modify the collaboration information from a plurality of the mobile devices. By way of example, the invited users of a virtual environment may send the virtual conference platform 101 requests to edit a document. It is contemplated that multiple users may edit the collaboration information concurrently. The virtual conference platform 101 also modifies, as in step 507, in real-time, the collaboration information based on the received request.

Figure 6A:
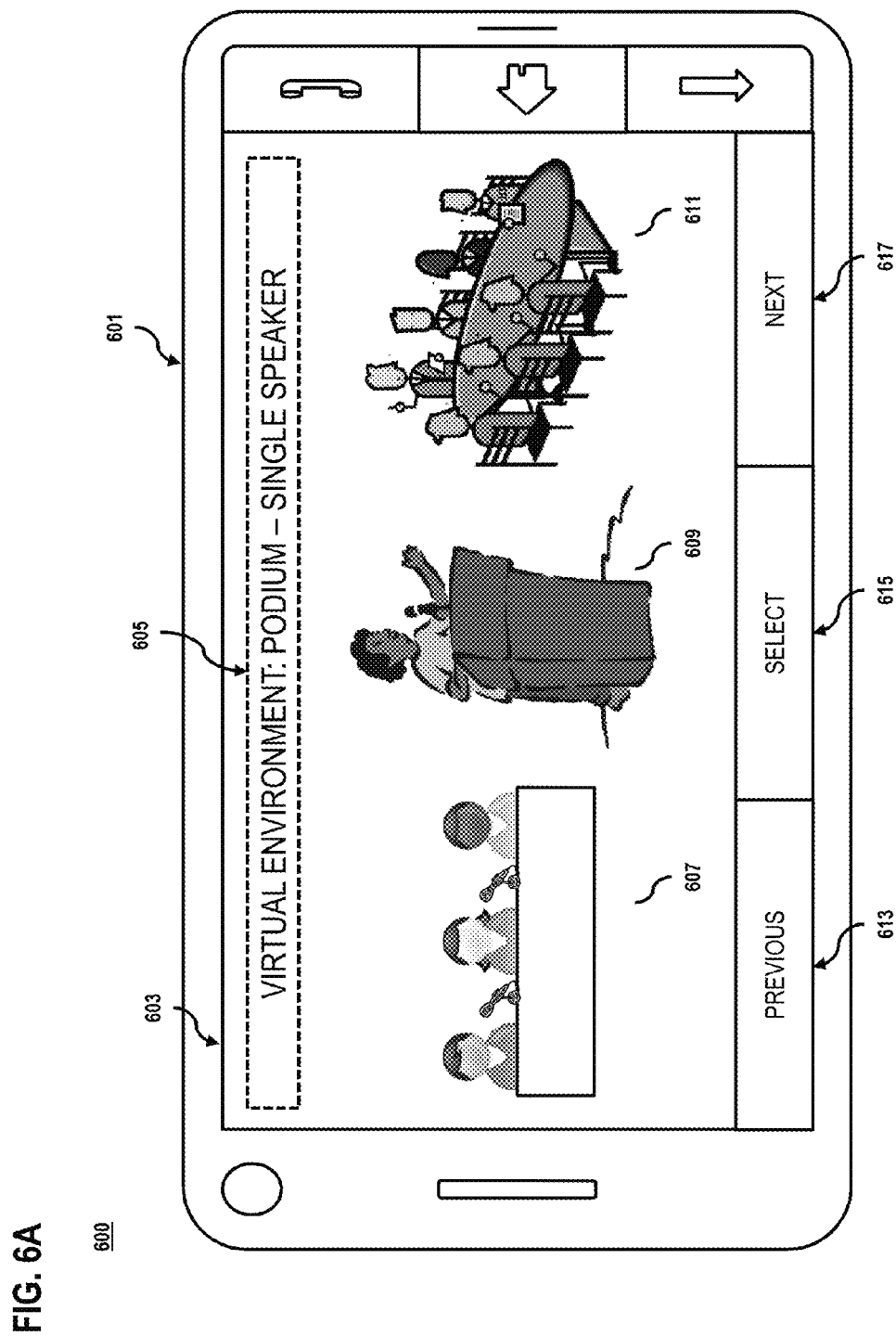
FIG. 6A-6D are illustration of one embodiment for providing video conferencing, according to an exemplary embodiment.
Figure 6B:
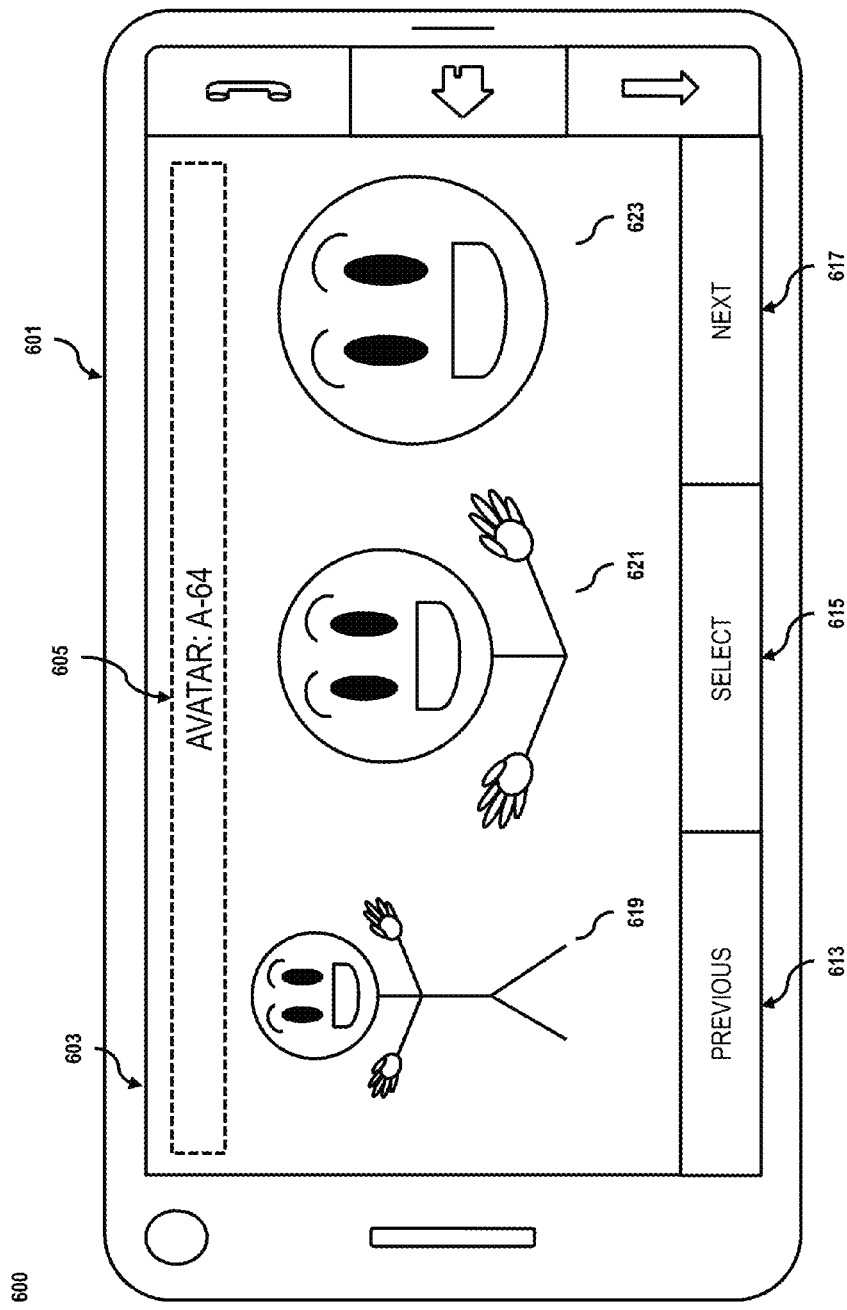
Figure 6C:
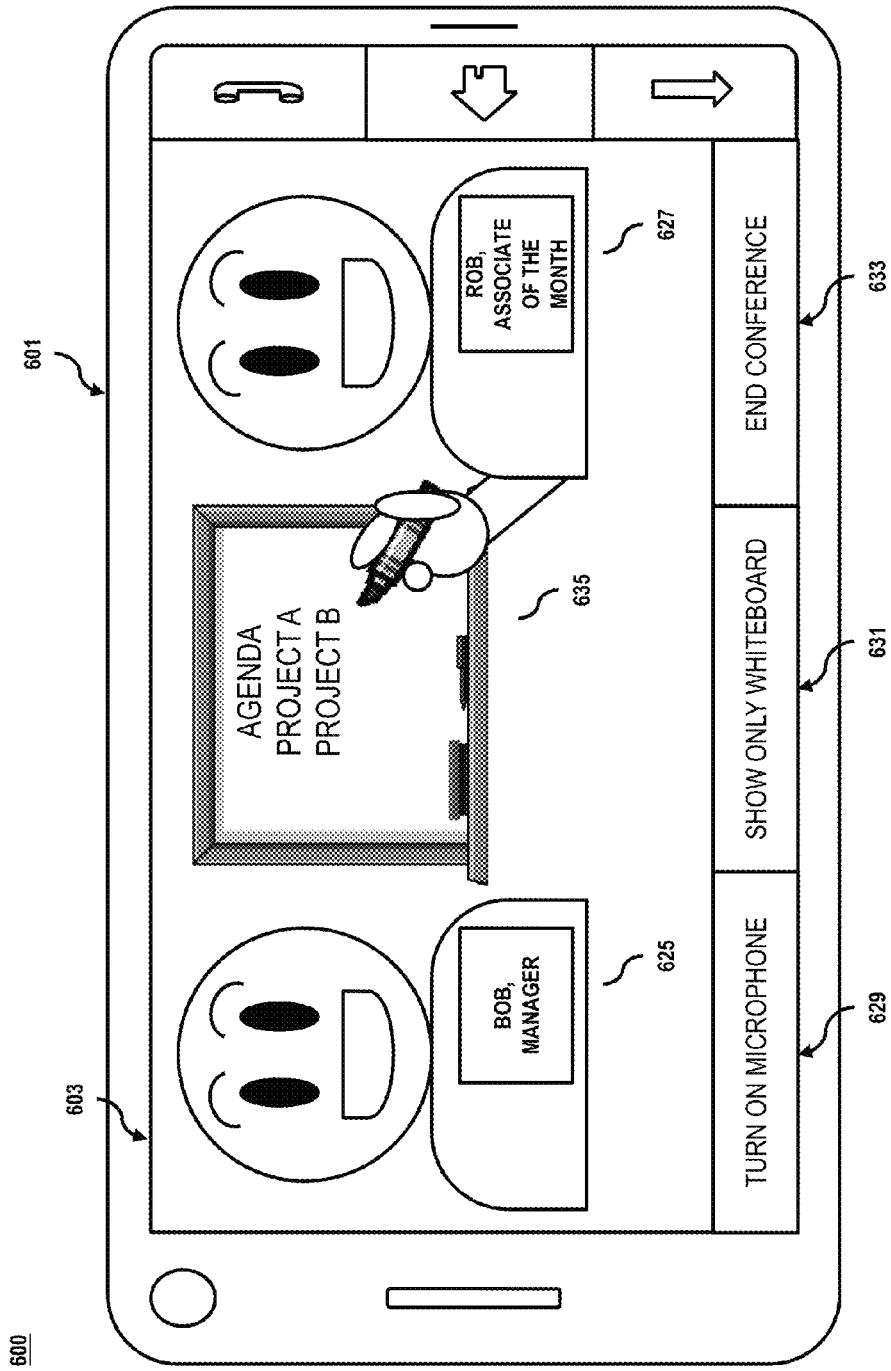
Figure 6D:
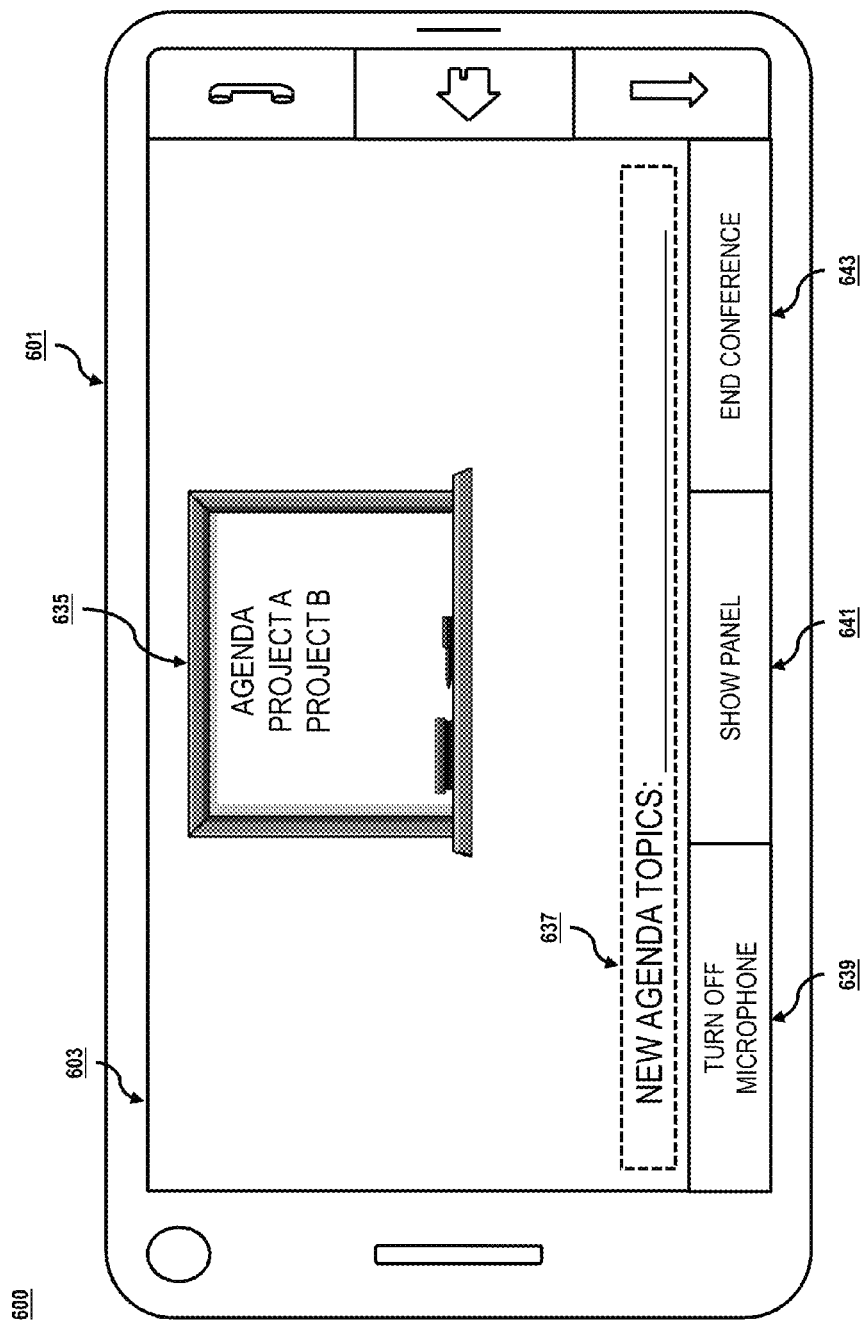

FIGS. 6A-6D are illustration of one embodiment for providing video conferencing, according to an exemplary embodiment. Specifically, FIG. 6A illustrates an exemplary graphical user interface, wherein the mobile device 103 displays virtual environments along with selectable options. FIG. 6B illustrates an additional exemplary graphical user interface, wherein the mobile device 103 displays avatars along with selectable options. FIG. 6C illustrates an exemplary graphical user interface, wherein the mobile device 103 displays a virtual environment, avatars, collaboration information, and selectable options. FIG. 6D illustrates an exemplary graphical user interface, wherein the mobile device 103 displays collaboration information and selectable options, including an option to modify the collaboration information.

As illustrated in FIG. 6A, an exemplary graphical user interface 600 is implemented using a mobile device 601 (e.g., mobile device 103), wherein the mobile device 601 displays on a touch sensitive display 603 a banner 605, virtual environments 607, 609, 611, and selectable options 613, 615, 617. In the exemplary embodiment, virtual environment 607 is a panel discussion, virtual environment 609 is a podium or single speaker, and virtual environment 611 is a round table discussion. Additionally, selectable option 613 displays "PREVIOUS," selectable option 615 displays "SELECT," and selectable option 617 displays "NEXT." The touch sensitive display 603 may detect the selection of one of the options 613, 615 and 617 and cause the screen to display additional information regarding the virtual environment 609 in the banner 605.

As illustrated in FIG. 6B, an exemplary graphical user interface 600 is implemented using a mobile device 601 (e.g., mobile device 103), wherein the mobile device 601 displays on a touch sensitive display 603 a banner 605, avatars 619, 621, 623, and selectable options 613, 615, 617. In the exemplary embodiment, avatar 619 is a representation of a user's entire body, avatar 621 is a representation of a user's head and hands, and avatar 623 is representation of a user's head. The touch sensitive display 603 may detect the selection of one of the options 613, 615 and 617 and cause the screen to display additional information regarding the avatar 621 in the banner 605. It is contemplated that avatar may be selected for use in the virtual environment.

As illustrated in FIG. 6C, an exemplary graphical user interface 600 is implemented using a mobile device 601 (e.g., mobile device 103), wherein the mobile device 601 displays on a touch sensitive display 603 avatars 625, 627, selectable options 629, 631, 633, and collaboration information 635. In the exemplary embodiment, avatar 625 is a representation of a first user, and avatar 627 is representation of a second user. In the exemplary embodiment, avatar 625 includes a name, and title. Avatar 627 includes a name, title, and is indicated as modifying collaborative information by the presence of a writing utensil. Additionally, selectable option 629 displays "TURN ON MICROPHONE," selectable option 631 displays "SHOW ONLY WHITEBOARD," and selectable option 633 displays "END CONFERENCE." The touch sensitive display 603 may detect the selection of one of the options 613, 615 and 617 and cause the mobile device 601, and/or the virtual conference platform 101 to perform additional functions.

As illustrated in FIG. 6D, an exemplary graphical user interface 600 is implemented using a mobile device 601 (e.g., mobile device 103), wherein the mobile device 601 displays on a touch sensitive display 603 collaboration information 635, input section 637, and selectable options 639, 641, 643. In the exemplary embodiment, a user can input changes into input section 637 to modify the collaboration information 635. Additionally, selectable option 639 displays "TURN OFF MICROPHONE," selectable option 641 displays "SHOW PANEL," and selectable option 643 displays "END CONFERENCE." The touch sensitive display 603 may detect the selection of one of the options 639, 641 and 643 and cause the mobile device 601, and/or the virtual conference platform 101 to perform additional functions.

In certain embodiments, the described processes and arrangements advantageously enable participants of a video conferencing session to control their perspective and environments for the session, thereby enhancing the user experience.

The processes described herein for providing virtual conferencing may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 7:
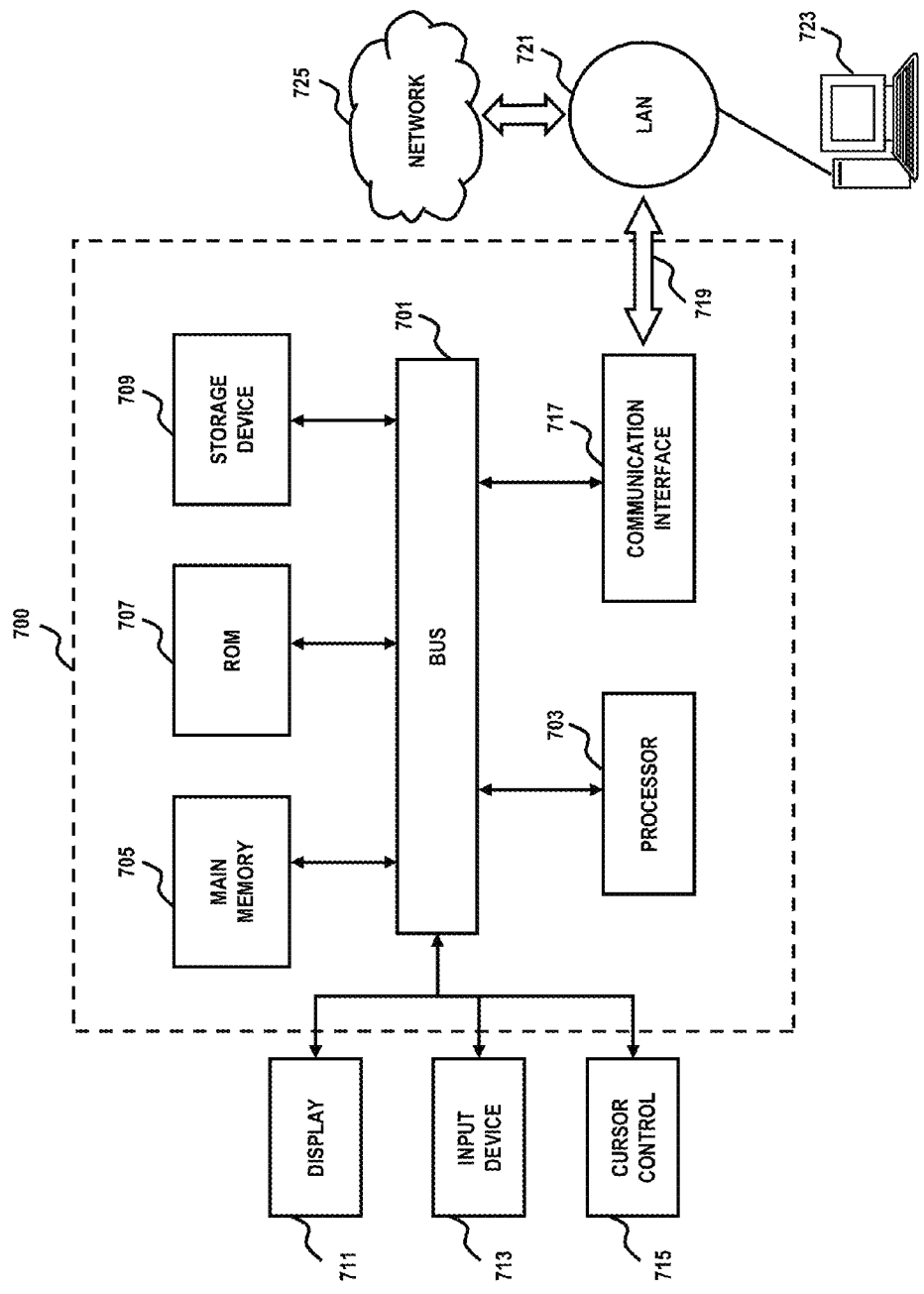
FIG. 7 is a diagram of a computer system that can be used to implement various exemplary embodiments.

FIG. 7 is a diagram of a computer system that can be used to implement various exemplary embodiments. The computer system 700 includes a bus 701 or other communication mechanism for communicating information and one or more processors (of which one is shown) 703 coupled to the bus 701 for processing information. The computer system 700 also includes main memory 705, such as a random access memory (RAM) or other dynamic storage device, coupled to the bus 701 for storing information and instructions to be executed by the processor 703. Main memory 705 can also be used for storing temporary variables or other intermediate information during execution of instructions by the processor 703. The computer system 700 may further include a read only memory (ROM) 707 or other static storage device coupled to the bus 701 for storing static information and instructions for the processor 703. A storage device 709, such as a magnetic disk, flash storage, or optical disk, is coupled to the bus 701 for persistently storing information and instructions.

The computer system 700 may be coupled via the bus 701 to a display 711, such as a cathode ray tube (CRT), liquid crystal display, active matrix display, or plasma display, for displaying information to a computer user. Additional output mechanisms may include haptics, audio, video, etc. An input device 713, such as a keyboard including alphanumeric and other keys, is coupled to the bus 701 for communicating information and command selections to the processor 703. Another type of user input device is a cursor control 715, such as a mouse, a trackball, touch screen, or cursor direction keys, for communicating direction information and command selections to the processor 703 and for adjusting cursor movement on the display 711.

According to an embodiment of the invention, the processes described herein are performed by the computer system 700, in response to the processor 703 executing an arrangement of instructions contained in main memory 705. Such instructions can be read into main memory 705 from another computer-readable medium, such as the storage device 709. Execution of the arrangement of instructions contained in main memory 705 causes the processor 703 to perform the process steps described herein. One or more processors in a multi-processing arrangement may also be employed to execute the instructions contained in main memory 705. In alternative embodiments, hard-wired circuitry may be used in place of or in combination with software instructions to implement the embodiment of the invention. Thus, embodiments of the invention are not limited to any specific combination of hardware circuitry and software.

The computer system 700 also includes a communication interface 717 coupled to bus 701. The communication interface 717 provides a two-way data communication coupling to a network link 719 connected to a local network 721. For example, the communication interface 717 may be a digital subscriber line (DSL) card or modem, an integrated services digital network (ISDN) card, a cable modem, a telephone modem, or any other communication interface to provide a data communication connection to a corresponding type of communication line. As another example, communication interface 717 may be a local area network (LAN) card (e.g. for Ethernet™ or an Asynchronous Transfer Mode (ATM) network) to provide a data communication connection to a compatible LAN. Wireless links can also be implemented. In any such implementation, communication interface 717 sends and receives electrical, electromagnetic, or optical signals that carry digital data streams representing various types of information. Further, the communication interface 717 can include peripheral interface devices, such as a Universal Serial Bus (USB) interface, a PCMCIA (Personal Computer Memory Card International Association) interface, etc. Although a single communication interface 717 is depicted in FIG. 7, multiple communication interfaces can also be employed.

The network link 719 typically provides data communication through one or more networks to other data devices. For example, the network link 719 may provide a connection through local network 721 to a host computer 723, which has connectivity to a network 725 (e.g. a wide area network (WAN) or the global packet data communication network now commonly referred to as the "Internet") or to data equipment operated by a service provider. The local network 721 and the network 725 both use electrical, electromagnetic, or optical signals to convey information and instructions. The signals through the various networks and the signals on the network link 719 and through the communication interface 717, which communicate digital data with the computer system 700, are exemplary forms of carrier waves bearing the information and instructions.

The computer system 700 can send messages and receive data, including program code, through the network(s), the network link 719, and the communication interface 717. In the Internet example, a server (not shown) might transmit requested code belonging to an application program for implementing an embodiment of the invention through the network 725, the local network 721 and the communication interface 717. The processor 703 may execute the transmitted code while being received and/or store the code in the storage device 709, or other non-volatile storage for later execution. In this manner, the computer system 700 may obtain application code in the form of a carrier wave.

The term "computer-readable medium" as used herein refers to any medium that participates in providing instructions to the processor 703 for execution. Such a medium may take many forms, including but not limited to computer-readable storage medium ((or non-transitory)—i.e., non-volatile media and volatile media), and transmission media. Non-volatile media include, for example, optical or magnetic disks, such as the storage device 709. Volatile media include dynamic memory, such as main memory 705. Transmission media include coaxial cables, copper wire and fiber optics, including the wires that comprise the bus 701. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 8:
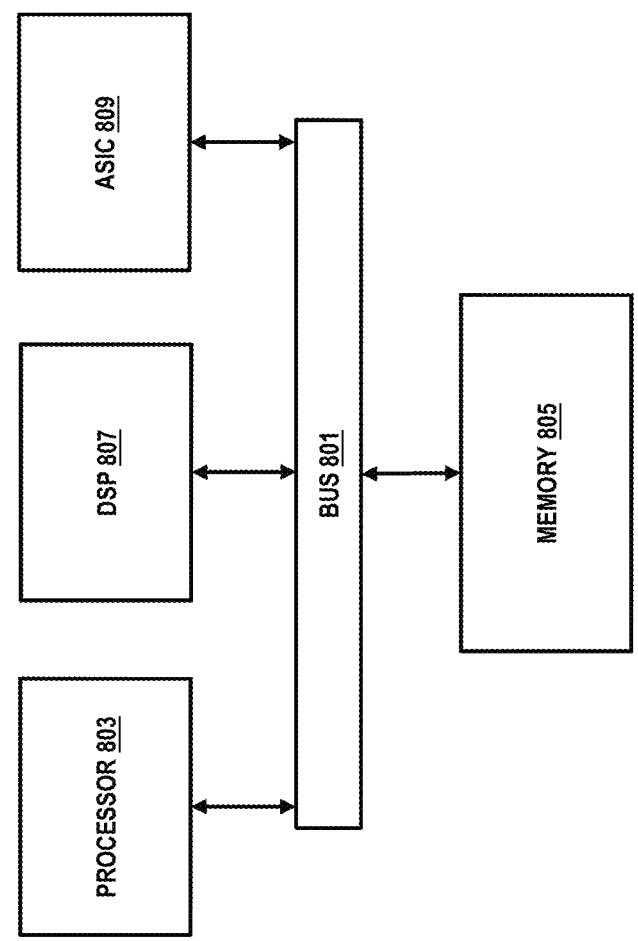
FIG. 8 is a diagram of a chip set that can be used to implement an embodiment of the invention.

FIG. 8 illustrates a chip set or chip 800 upon which an embodiment of the invention may be implemented. Chip set 800 is programmed to enable virtual conferencing as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 800 can be implemented in a single chip. It is further contemplated that in certain embodiments the chip set or chip 800 can be implemented as a single "system on a chip." It is further contemplated that in certain embodiments a separate ASIC would not be used, for example, and that all relevant functions as disclosed herein would be performed by a processor or processors. Chip set or chip 800, or a portion thereof, constitutes a means for performing one or more steps of enabling virtual conferencing.

In one embodiment, the chip set or chip 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real-time independently of the processor 803. Similarly, an ASIC 809 can be configured to performed specialized functions not easily performed by a more general purpose processor. For example, a graphics processing unit (GPU) may be included to facilitate the rendering of images. Other specialized components to aid in performing the inventive functions described herein may include one or more field programmable gate arrays (FPGA) (not shown), one or more controllers (not shown), or one or more other special-purpose computer chips.

In one embodiment, the chip set or chip 800 includes merely one or more processors and some software and/or firmware supporting and/or relating to and/or for the one or more processors.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein to enable virtual conferencing. The memory 805 also stores the data associated with or generated by the execution of the inventive steps.

Figure 9:
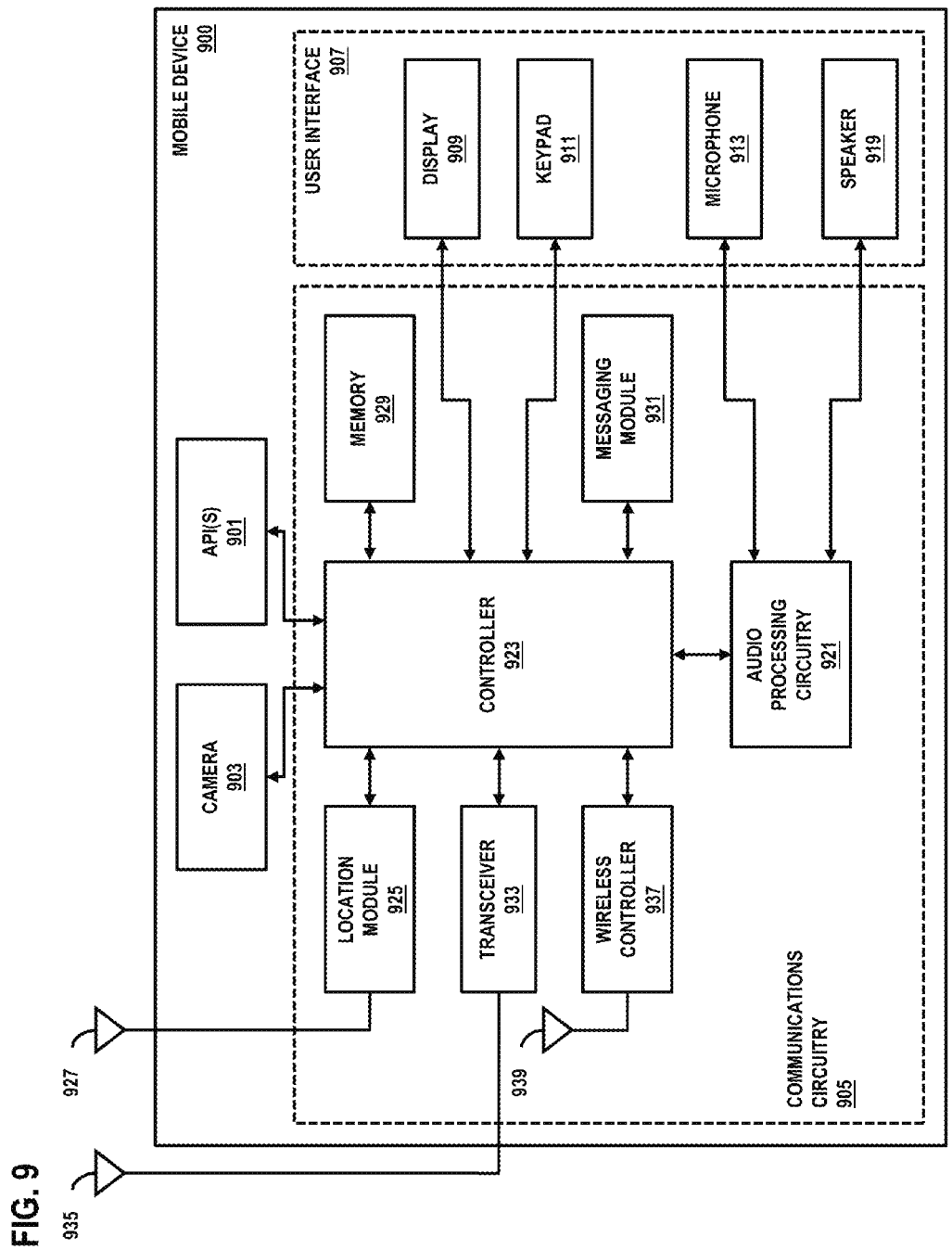
FIG. 9 is a diagram of a mobile device configured to facilitate virtual conferencing, according to an exemplary embodiment.

FIG. 9 is a diagram of a mobile device configured to facilitate virtual conferencing, according to an exemplary embodiment. Mobile device 900 (e.g., equivalent to the mobile device 103) may comprise computing hardware (such as described with respect to FIGS. 7 and 8), as well as include one or more components configured to execute the processes described herein for facilitating the virtual conferencing services of system 100. In this example, mobile device 900 includes application programming interface(s) 901, camera 903, communications circuitry 905, and user interface 907. While specific reference will be made hereto, it is contemplated that mobile device 900 may embody many forms and include multiple and/or alternative components.

According to exemplary embodiments, user interface 907 may include one or more displays 909, keypads 911, microphones 913, and/or speakers 919. Display 909 provides a graphical user interface (GUI) that permits a user of mobile device 900 to view dialed digits, call status, menu options, and other service information. Specifically, the display 909 may allow viewing of, for example, a virtual conference. The GUI may include icons and menus, as well as other text and symbols. Keypad 911 includes an alphanumeric keypad and may represent other input controls, such as one or more button controls, dials, joysticks, touch panels, etc. The user thus can construct user profiles, enter commands, initialize applications, input remote addresses, select options from menu systems, and the like. Specifically, the keypad 911 may enable the inputting of settings, inviting of users to a virtual conference, changes to collaboration information and the like. Microphone 913 converts spoken utterances of a user (or other auditory sounds, e.g., environmental sounds) into electronic audio signals, whereas speaker 919 converts audio signals into audible sounds. Similar to the displays 909, the speaker 919 may enable the mobile device 900 to hear the audible sounds detected by other mobile devices connected to the system 100. Likewise, the microphone 913 may allow a user to input audible sounds that may be made audible to other users by speakers located on other mobile devices.

A camera 903 may be used as an input device to detect images representing a user. Additionally, or alternatively the camera 903 may be used to detect inputs, to for example, select options, add users, modify collaboration information and the like.

Communications circuitry 905 may include audio processing circuitry 921, controller 923, location module 925 (such as a GPS receiver) coupled to antenna 927, memory 929, messaging module 931, transceiver 933 coupled to antenna 935, and wireless controller 937 coupled to antenna 939. Memory 929 may represent a hierarchy of memory, which may include both random access memory (RAM) and read-only memory (ROM). Computer program instructions and corresponding data for operation can be stored in non-volatile memory, such as erasable programmable read-only memory (EPROM), electrically erasable programmable read-only memory (EEPROM), and/or flash memory. Memory 929 may be implemented as one or more discrete devices, stacked devices, or integrated with controller 923. Memory 929 may store information, such as contact lists, preference information, collaboration information, playback data and the like. As previously noted, it is contemplated, that functions performed by the virtual conference platform 101 may be performed by the mobile device 900. For example, the mapping of a image representing a user on an avatar may be performed by the mobile device 900.

Additionally, it is contemplated that mobile device 900 may also include one or more applications and, thereby, may store (via memory 929) data associated with these applications for providing users with browsing functions, business functions, calendar functions, communication functions, contact managing functions, data editing (e.g., database, word processing, spreadsheets, etc.) functions, financial functions, gaming functions, imaging functions, messaging (e.g., electronic mail, IM, MMS, SMS, etc.) functions, multimedia functions, service functions, storage functions, synchronization functions, task managing functions, querying functions, and the like. As such, signals received by mobile device 900 from, for example, conference platform 101 may be utilized by API(s) 901 and/or controller 923 to facilitate the sharing of information, and improving the user experience.

Accordingly, controller 923 controls the operation of mobile device 900, such as in response to commands received from API(s) 901 and/or data stored to memory 929. Control functions may be implemented in a single controller or via multiple controllers. Suitable controllers 923 may include, for example, both general purpose and special purpose controllers and digital signal processors. Controller 923 may interface with audio processing circuitry 921, which provides basic analog output signals to speaker 919 and receives analog audio inputs from microphone 913.

Mobile device 900 also includes messaging module 931 that is configured to receive, transmit, and/or process messages (e.g., enhanced messaging service (EMS) messages, SMS messages, MMS messages, instant messaging (IM) messages, electronic mail messages, and/or any other suitable message) received from (or transmitted to) conference platform 101 or any other suitable component or facility of system 100. As such, messaging module 931 may be configured to receive, transmit, and/or process information shared by the mobile device 900. For example, conference platform 101 can send an SMS notifying the user of a request to join a virtual conference.

It is also noted that mobile device 900 can be equipped with wireless controller 937 to communicate with a wireless headset (not shown) or other wireless network. The headset can employ any number of standard radio technologies to communicate with wireless controller 937; for example, the headset can be Bluetooth enabled. It is contemplated that other equivalent short range radio technology and protocols can be utilized. While mobile device 900 has been described in accordance with the depicted embodiment of FIG. 9, it is contemplated that mobile device 900 may embody many forms and include multiple and/or alternative components.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
initiating a video conferencing session involving a plurality of mobile devices;
receiving, in real-time, images representing users of the respective mobile devices;
selecting a virtual environment among a plurality of virtual environments;
determining positions in the virtual environment for the users;
generating virtual images of the users from an angle of view of each of the users in the selected virtual environment based on the positions and the received images;
integrating the virtual images for the angle of view of each user into the selected virtual environment;
selecting one or more avatars based on the selected virtual environment, the users, and a combination thereof;
mapping a portion of one or more of the received images onto the one or more avatars; and
rendering, in the selected virtual environment, the one or more avatars with one or more body movements corresponding to one or more body movements of the users in real world.

2. The method according to claim 1, further comprising:
modifying the virtual images based on the selected virtual environment,
wherein the positions in the virtual environment are different from physical locations of the mobile devices.

3. The method according to claim 1, further comprising:
detecting an input into the mobile devices indicating a selection of the virtual environment, wherein the selecting of the virtual environment is based on the detection of the input, and the angle of view of each user is varied as requested by the each user.

4. The method according to claim 1, further comprising:
selecting an image representing a designated user; and
rendering the image representing the designated user with an emphasis added,
wherein the integration of the images into the selected virtual environment includes processing the images to support multiple user perspectives.

5. The method according to claim 4, further comprising:
detecting an input into the mobile devices indicating a selection of the designated user, wherein the image representing a designated user is selected based on the detected input.

6. The method according to claim 1, further comprising:
receiving, in real-time, collaboration information, wherein the collaboration information is accessible by the mobile devices;
receiving, in real-time, requests to modify the collaboration information from a plurality of the mobile devices; and
modifying, in real-time, the collaboration information based on the received requests.

7. The method according to claim 6, further comprising:
integrating the collaboration information into the selected virtual environment.

8. The method according to claim 6, further comprising:
selecting a designated user among a plurality of users based on the received requests to modify;
selecting an image representing the designated user; and
rendering the image representing the designated user with an emphasis added.

9. A method comprising:
initiating, by a mobile device, a video conferencing session, wherein the video conferencing session involves a plurality of mobile devices including the mobile device;
receiving, by the mobile device in real-time, images of users of the other mobile devices;
determining, by the mobile device, positions in a selected virtual environment for the users of the other mobile devices;
generating, by the mobile device, virtual images of the users from an angle of view of each of the users in the selected virtual environment based on the positions and the received images;
integrating, by the mobile device, the virtual images for the angle of view of each user into the selected virtual environment; and
sending, by the mobile device to the other mobile devices in real-time, integrated images representing a user of the mobile device from the angle of view of each other user in the selected virtual environment and the integrated images including the one or more other users within the angle of view in the selected virtual environment.

10. The method according to claim 9, further comprising:
displaying the integrated images of the virtual environment on at least one display; and
detecting an input into the mobile device indicating a selection modifying the integrated images, wherein the integrated images are modified based on the detected input.

11. An apparatus comprising:
at least one processor; and
at least one memory including computer program code for one or more programs,
the at least one memory and the computer program code configured to, with the at least one processor, cause the apparatus to perform at least the following:
initiate a video conferencing session involving a plurality of mobile devices;
receive, in real-time, images representing users of the respective mobile devices;
select a virtual environment among a plurality of virtual environments;
determine positions in the virtual environment for the users;
generate virtual images of the users from an angle of view of each of the users in the selected virtual environment based on the positions and the received images;
integrate the virtual images for the angle of view of each user into the selected virtual environment;
select one or more avatars based on the selected virtual environment, the users, and a combination thereof;
map a portion of one or more of the received images onto the one or more avatars; and
render, in the selected virtual environment, the one or more avatars with one or more body movements corresponding to one or more body movements of the users in real world.

12. The apparatus according to claim 11, wherein the apparatus is further caused to:
  modify the images based on the selected virtual environment.

13. The apparatus according to claim 11, wherein the apparatus is further caused to:
  detect an input into the mobile devices indicating a selection of the virtual environment, wherein the selecting of the virtual environment is based on the detection of the input.

14. The apparatus according to claim 11, wherein the apparatus is further caused to:
  select an image representing a designated user; and
  render the image representing the designated user with an emphasis added.

15. The apparatus according to claim 14, wherein the apparatus is further caused to:
  detect an input into the mobile devices indicating a selection of the designated user, wherein the image representing a designated user is selected based on the detected input.

16. The apparatus according to claim 11, wherein the apparatus is further caused to:
  receive, in real-time, collaboration information, wherein the collaboration information is accessible by the mobile devices;
  receive, in real-time, requests to modify the collaboration information from a plurality of the mobile devices; and
  modify, in real-time, the collaboration information based on the received requests.

17. The apparatus according to claim 16, wherein the apparatus is further caused to:
  integrate the collaboration information into the selected virtual environment.

18. The apparatus according to claim 16, wherein the apparatus is further caused to:
  select a designated user among a plurality of users based on the received requests to modify;
  select an image representing the designated user; and
  render the image representing the designated user with an emphasis added.

19. The apparatus according to claim 11, wherein the apparatus is further caused to:
  select one or more avatars based on the selected virtual environment; and
  map a portion of one or more of the images onto the one or more avatars.

20. An apparatus comprising:
  at least one processor; and
  at least one memory including computer program code for one or more programs,
  the at least one memory and the computer program code configured to, with the at least one processor, cause the apparatus embedded in a mobile device to perform at least the following:
  initiate a video conferencing session, wherein the video conferencing session involves a plurality of mobile devices including the mobile device;
  receive, in real-time, images of users of the other mobile devices;
  determine positions in a selected virtual environment for the users of the other mobile devices;
  generate virtual images of the users from an angle of view of each of the users in the selected virtual environment based on the positions and the received images;
  integrate the virtual images for the angle of view of each user into the selected virtual environment; and
  send, from the mobile device to the other mobile devices in real-time, integrated images representing a user of the mobile device from the angle of view of each other user in the selected virtual environment and the integrated images including the one or more other users within the angle of view in the selected virtual environment.

21. The apparatus according to claim 20, wherein the apparatus is further caused to:
  cause, at least in part, a display of the integrated images of the virtual environment on at least one display; and
  cause, at least in part, a detection of an input into the mobile device indicating a selection modifying the integrated images, wherein the integrated images are modified based on the detected input.

* * * * *